United States Patent
Doering et al.

(10) Patent No.: US 8,241,177 B2
(45) Date of Patent: Aug. 14, 2012

(54) METHODS AND SYSTEMS FOR TURBOCHARGER CONTROL

(75) Inventors: Jeffrey Allen Doering, Canton, MI (US); John Eric Rollinger, Sterling Heights, MI (US); De-Shiou Chen, Canton, MI (US); Julia Helen Buckland, Dearborn, MI (US); Suzanne Kay Wait, Royal Oak, MI (US); Matthew John Gerhart, Dearborn Heights, MI (US); Peter Douglas Kuechler, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 557 days.

(21) Appl. No.: 12/546,334

(22) Filed: Aug. 24, 2009

(65) Prior Publication Data

US 2011/0045948 A1 Feb. 24, 2011

(51) Int. Cl.
*F02D 23/00* (2006.01)
(52) U.S. Cl. ............................................ 477/33; 477/32
(58) Field of Classification Search .................. 477/32, 477/33, 107, 110, 111, 115, 121
See application file for complete search history.

(56) References Cited

U.S. PATENT DOCUMENTS

| | | | |
|---|---|---|---|
| 4,263,826 A | | 4/1981 | Hartz et al. |
| 5,205,191 A | * | 4/1993 | Takata et al. ................. 477/33 |
| 5,226,351 A | | 7/1993 | Matsuoka et al. |
| 5,228,368 A | * | 7/1993 | Kato et al. .................... 477/33 |
| 5,454,767 A | * | 10/1995 | Clausen et al. ............... 477/32 |
| 6,692,406 B2 | | 2/2004 | Beaty |
| 2008/0276614 A1 | | 11/2008 | Shu et al. |

OTHER PUBLICATIONS

Doering, Jeffrey et al., "Methods and Systems for Turbocharger Control," U.S. Appl. No. 12/546,297, filed Aug. 24, 2009, 36 pages.

* cited by examiner

*Primary Examiner* — Justin Holmes
(74) *Attorney, Agent, or Firm* — Julia Voutyras; Alleman Hall McCoy Russell & Tuttle LLP

(57) ABSTRACT

Methods and systems are provided for controlling a vehicle engine, the engine including a turbocharger and a transmission. One example method comprises, operating the transmission at a first lower gear with a first boost level, increasing the boost from the first boost level before completing a shift from the first lower gear to a second higher gear, and after completing the shift, operating the transmission at the second higher gear with the increased boost.

20 Claims, 4 Drawing Sheets

METHODS AND SYSTEMS FOR TURBOCHARGER CONTROL

FIELD

The present application relates to methods and systems for controlling the turbocharger boost, specifically during gear shifts.

BACKGROUND AND SUMMARY

Vehicles may be configured with transmissions wherein gears are automatically shifted responsive to vehicle operating conditions. During gear upshifts, engine speed is reduced. Then, following the upshift, the engine speed is returned to an increased level. To provide good driveability, following the gear upshift, power losses to the wheels (due to the engine speed reduction), may be compensated for by providing more engine torque. Vehicle engines may use boosting devices, such as turbochargers, to provide more aircharge and achieve increased engine torque. However, due to turbocharger inertia, the turbocharger speed, and consequently turbocharger boost, desired during and following the upshift is delayed with respect to the engine speed change. As such, this turbo lag results in the feeling of a poor and slow shift, and reduces vehicle performance.

Various control strategies may be used to adjust a turbocharger boost during transmission upshifts. One example approach is illustrated by Beaty in U.S. Pat. No. 6,692,406 B2. Herein, a selected engine operating parameter, such as a fuel injection setting or a wastegate control valve setting, is modulated to maintain the boost pressure during an upshift, and thereby reduce turbo lag. Specifically, in an engine operating in a maximum foot pedal position and an associated full-load condition, the selected engine operating parameter is modulated by maintaining the rotational speed of the turbocharger while the engine speed is reduced.

However, the inventors have recognized several potential issues with such a method. As one example, the approach involves maintaining the boost pressure at an elevated level during and following the gear upshift. As such, this approach may reduce turbo lag under maximum foot pedal position and engine full-load conditions. However, under conditions when the foot pedal position is not maximal, and engine loads are lower, maintaining boost pressure at the elevated level may substantially reduce fuel economy at the lower gear. As another example, the approach entails operating the wastegate valve with open loop control to maximize the turbine's power during the otherwise reduced airflow condition of the transmission upshift. However, as noted above, under conditions when the load is less than full and/or the pedal position is sub-maximal, operating in this way may substantially reduce fuel economy.

Thus in one example, some of the above issues may be addressed by a method for controlling a vehicle engine, the engine including a turbocharger and a transmission. One example method comprises, operating the transmission at a first lower gear with a first boost level, increasing the boost from the first boost level before completing a shift from the first lower gear to a second higher gear, and after completing the shift, operating the transmission at the second higher gear with the increased boost.

For example, based at least on a vehicle speed and engine load profile, a transmission gear upshift may be anticipated. Based on the prediction of an upshift, a drop in engine speed following the upshift may also be anticipated. To compensate for potential torque losses responsive to the drop in engine speed, an elevated boost may be scheduled following the gear upshift. Thus, in response to the upshift prediction, an engine controller may be configured to preposition the boost. That is, a boost build-up to the desired elevated level may be initiated responsive to the upshift prediction, for example, shortly after the boost prediction, but before the shift is completed. In one example, the boost level may be elevated by decreasing a degree of opening, and/or a duration of opening, of a turbocharger wastegate valve. The elevated boost may be blended in during a transition period preceding the upshift such that the elevated boost is attained, and held in reserve, substantially before the actual gear upshift. Torque disturbances arising during the transition period due to the elevated boost may be compensated using throttle adjustments. In this way, the elevated boost level needed immediately following a transmission upshift may be provided. In so doing, the quality of transmission shifts and engine performance may be improved. Furthermore, it may be possible to shift earlier during vehicle acceleration, thus further improving overall fuel efficiency of the powertrain, while also overcoming any turbocharger lag.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for adjusting engine operation during transmission gear shifts. Specifically, the method enables potential torque differences, arising due to engine speed changes during and/or after the gear shift, to be compensated for using a turbocharger. An engine controller may be configured to perform a control routine, such as the routine depicted in FIG. 3, following the prediction of an upcoming gear shift, to adjust the settings and schedule of a turbocharger boost during the gear shift. The turbocharger settings may be adjusted to match a predicted boost profile. As illustrated in FIG. 4, the turbocharger adjustments may be initiated before the gear shift commences and may continue during a transition period before the gear shift is completed. Further torque adjustments may be achieved by modulating the throttle. That is, the turbocharger settings may be adjusted to preposition the boost in anticipation of a desired boost level. By prepositioning the boost, a manifold pressure "reserve" may be achieved before the shift, allowing a torque desired during and after the shift to be attained on demand. In this way, by prepositioning the boost, a desired engine aircharge and torque can be achieved throughout and after the gear shift, thereby improving the shift quality and vehicle driveability.

Figure 1:
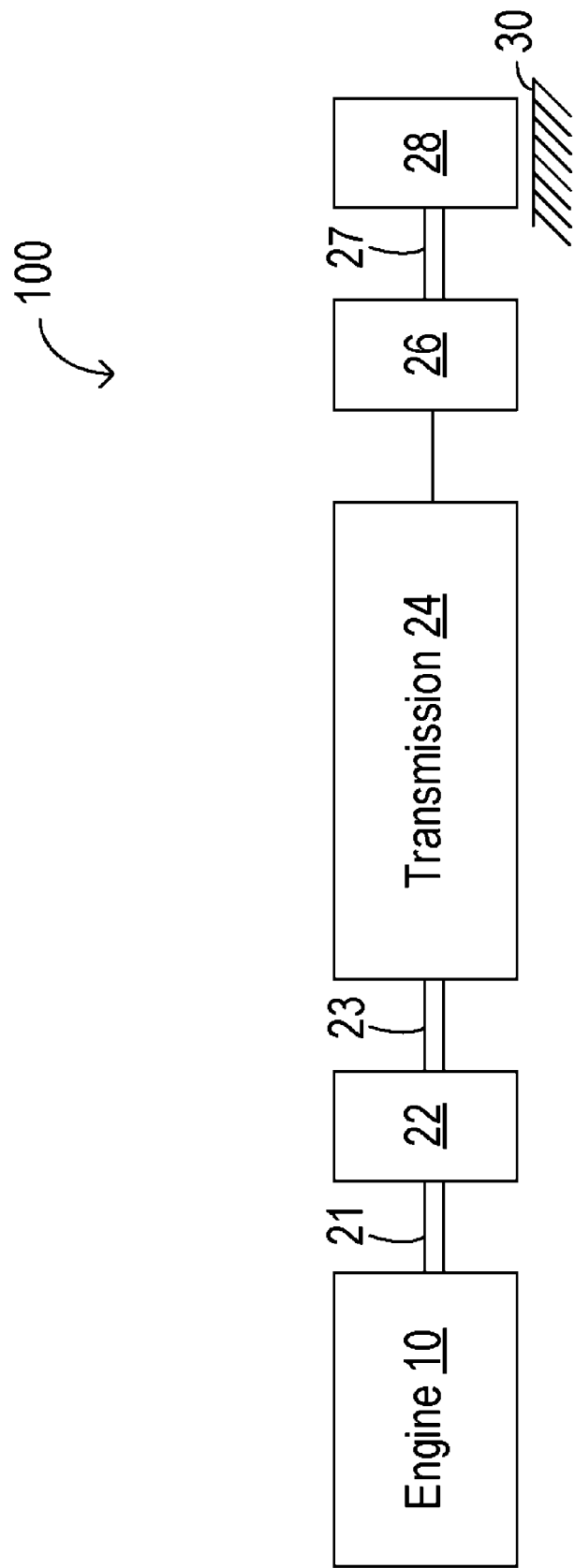
FIG. 1 shows an example vehicle system layout, including details of a vehicle drive-train.
Figure 2:
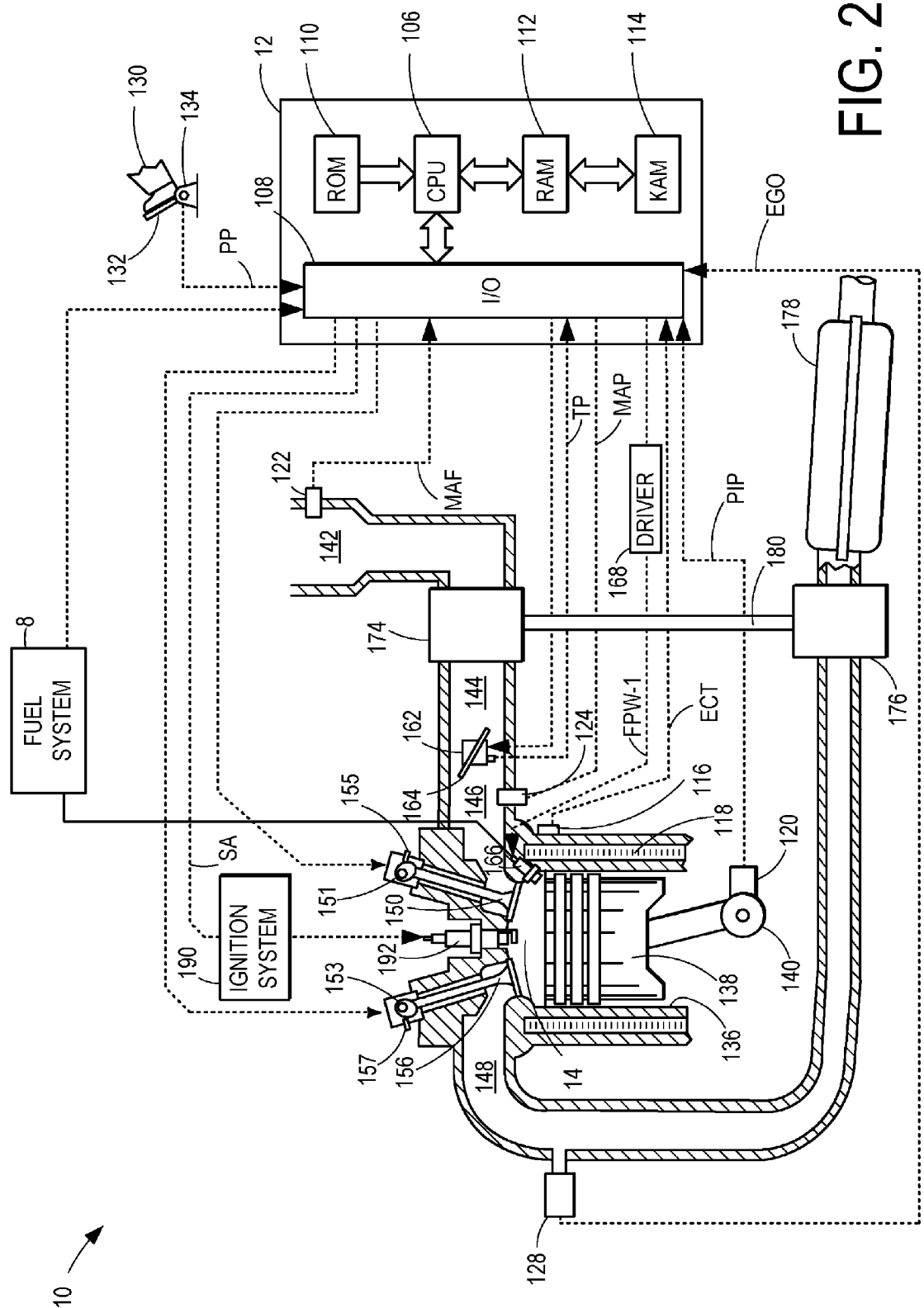
FIG. 2 shows a partial engine view.

FIG. 1 depicts an example embodiment of a vehicle system 100. As illustrated, an internal combustion engine 10, further described herein in FIG. 2, is shown coupled to torque converter 22 via crankshaft 21. Torque converter 22 is also coupled to transmission 24 via turbine shaft 23. Torque converter 22 has a bypass, or lock-up clutch (not shown) which may be engaged, disengaged, or partially engaged. When the clutch is either disengaged or partially engaged, the torque converter is said to be in an unlocked state. The lock-up clutch may be actuated electrically, hydraulically, or electro-hydraulically, for example. The lock-up clutch may receive a control signal from the controller, such as a pulse width modulated signal, to engage, disengage, or partially engage, the clutch based on engine, vehicle, and/or transmission operating conditions.

Turbine shaft 23 is also known as a transmission input shaft. Transmission 24 comprises an electronically controlled transmission with a plurality of selectable discrete gear ratios. Transmission 24 also comprises various other gears, such as, for example, a final drive ratio 26. In alternate embodiments, a manual transmission operated by a driver with a clutch may be used. Further, various types of automatic transmission may be used. Transmission 24 is coupled to tire 28 via axle 27. Tire 28 interfaces the vehicle (not shown) to the road 30. In one embodiment, the powertrain of vehicle system 100 is coupled in a passenger vehicle that travels on the road.

FIG. 2 depicts an example embodiment of a combustion chamber or cylinder of the engine 10 of FIG. 1. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A wastegate (not shown) may be included on the turbine side of the turbocharger to control the amount of exhaust gas reaching the turbine from exhaust passage 148. Specifically, the boost magnitude may be adjusted by controller 12 by modulating a degree of opening, and/or a duration of opening, of a wastegate valve. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174. As elaborated herein with reference to FIG. 4, controller 12 may be configured to further adjust an amount of boost provided to the engine by adjusting a degree of opening of throttle 162.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder. The opening and closing of the valves may be controlled by hydraulically actuated lifters coupled to valve pushrods, or via a cam profile switching mechanism. For example, intake valve 150 and exhaust valve 156 may be controlled by cam actuation via respective cam actuation systems 151 and 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 2 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold air pressure signal (MAP) from sensor 124. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 124 may be used to provide an indication of vacuum, or pressure, in the intake manifold. Further, manifold pressure may be estimated based on other operating parameters, such as based on MAF and RPM, for example.

Controller 12 may also be configured to adjust an amount of boost provided to the engine intake manifold during and after a transmission gear shift. Upon the prediction of an upcoming gear shift, for example an upcoming gear upshift, the controller may anticipate an upcoming drop in engine speed and a simultaneous need for more torque. As elaborated with reference to FIGS. 3-4, the controller may schedule an increase in boost to start before the gear shift, and continue through the gear shift, such that an increased boost is available before the gear shift has been completed. The controller may determine an amount of boost increase based on the new gear following the shift, and/or engine operating conditions in the new gear. Additionally, a time of initiating the boost increase may be adjusted. In some examples, based on the engine operating conditions, the controller may also be configured to adjust a time of actual gear shifting (for example, by shifting the gear earlier than previously scheduled, or later than previously scheduled). By prepositioning the boost based on a predicted boost profile, an amount of manifold pressure may be kept in reserve and provided substantially immediately, upon driver demand.

Figure 3:
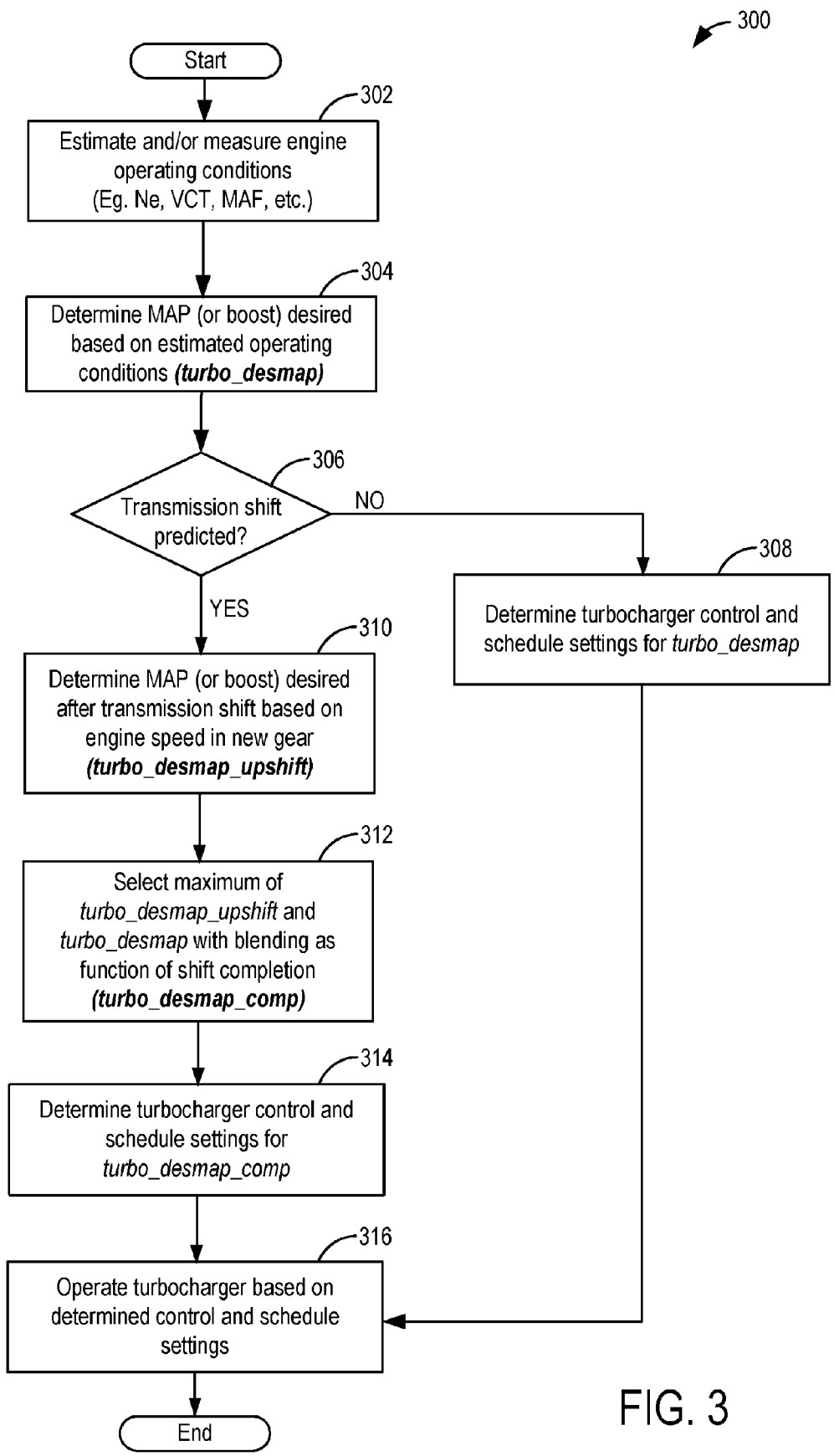
FIG. 3 shows a high level flow chart for adjusting a turbocharger boost during a transmission gear upshift according to the present disclosure.
Figure 4:
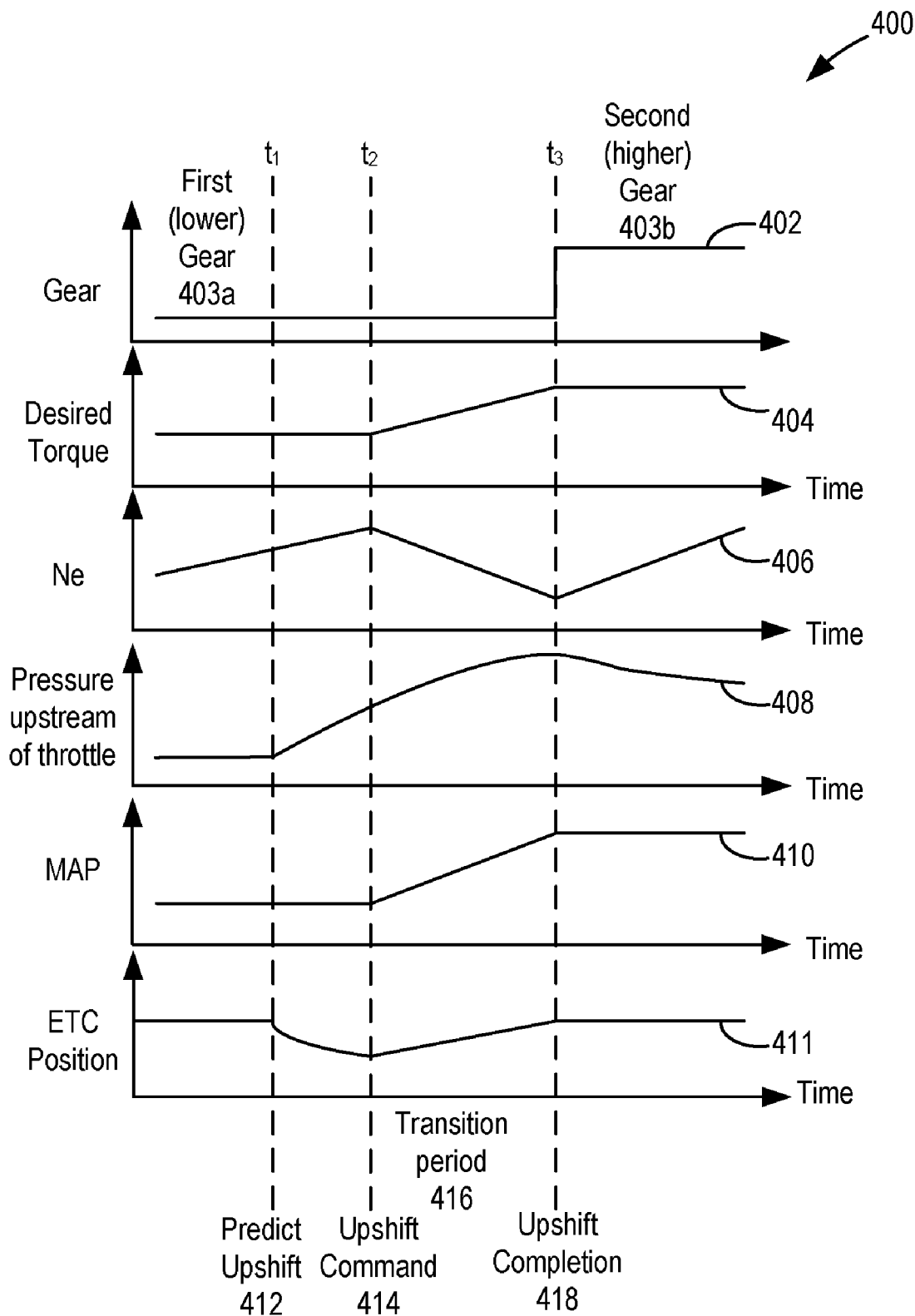
FIG. 4 shows a graphical representation of an example turbocharger boost adjustment.

Now turning to FIG. 3, a routine 300 is described for adjusting a turbocharger schedule and settings to achieve a desired boost profile upon the prediction of an upcoming transmission gear shift.

At 302, engine operating conditions may be estimated, measured, and/or inferred. The conditions assessed may include, for example, engine speed ($N_e$), barometric pressure, manifold pressure (MAP), manifold air flow (MAF), a cam timing (VCT), a driver-demanded torque (for example, from a pedal-position sensor), engine temperature, air temperature, other engine airflow actuator settings, a current transmission gear, etc. At 304, based on the estimated engine operating conditions, a desired manifold pressure or boost (or boost profile) (turbo_desmap) may be determined. For example, the transmission may be operating at a first, lower, gear with a first boost level.

At 306, it is determined whether a transmission shift is predicted. That is, it is determined whether a transmission gear shift is coming up. In the depicted example, it may be determined whether a transmission gear upshift from the first lower gear to a second higher gear is predicted. However, in alternate examples, it may be determined whether a transmission downshift is coming up. As such, the higher gear may represent a gear at which, for a given engine speed, the vehicle wheels turn faster. In one example, the gear upshift is predicted based on a shift schedule. The shift schedule may be based at least on (and stored in terms of) a vehicle speed and/or engine load profile (for example, as indicated by a pedal position sensor). For example, as a vehicle speed increases at a given engine load, the routine may schedule an upshift from a first lower gear to a second, higher gear (such as, from a transmission first gear to a transmission second gear, or a transmission second gear to a transmission third gear, and so on).

If a transmission shift is not predicted, at 308, the routine may determine turbocharger control and schedule settings for the previously determined desired boost level (turbo_desmap). As such, the turbocharger settings adjusted may include a desired boosting level, a desired wastegate valve position, a desired vane position, a desired nozzle position, a desired airflow, a desired boost profile and schedule, etc. Additionally, the throttle position may be adjusted to attain the desired boost profile. The routine may then proceed to 316 to operate the turbocharger based on the determined settings to provide the desired boost profile. That is, the turbocharger may be operated to enable the transmission to be operated at the first, lower gear with the first lower boost level.

In comparison, if a transmission upshift from the first lower gear to a second higher gear is predicted, at 310, the routine may determine a second manifold pressure or boost level desired during and after the gear shift (turbo_desmap_upshift). That is, a change in boost levels between the different gears may be determined. As one example, during and after a gear upshift, the engine speed may reduce. Accordingly, a second higher boost may be needed during and after the gear shift to compensate for the potential torque loss due to the drop in engine speed. As such, even when the driver-demanded torque is substantially the same before and after the gear shift, the wheel torque in the second, higher gear, may be at or below the wheel torque in the first gear. In one example, the second boost level may be based on the nature of the second higher gear (that is, whether the second gear is a transmission second gear or third gear or fourth gear, etc.) and/or engine operating conditions in the second gear. The engine operating conditions may include, for example, an engine speed, an engine load, a desired engine torque, a cam timing, a vehicle speed, an engine airflow in the second gear, a manifold pressure in the second gear, and/or other engine airflow actuator settings in the second gear. In this way, the amount of boost increased in response to the prediction of a gear upshift may based on the second gear and engine operating conditions in the second gear.

At 312, the maximum of the determined boosts, that is, the larger of turbo_desmap and turbo_desmap_upshift, may be selected and a blending of the desired boost as a function of gear shift completion may be determined (turbo_desmap_comp). Alternatively, the desired map may be blended as a function of time, such as an amount of time following the prediction of a gear shift, or an amount of time following the start of the gear shift. Thus, in one example, the boost profile may be adjusted such that the boost increase is initiated following (for example, immediately after) the gear upshift prediction and completed before starting the shift. In another example, the boost profile may be adjusted to initiate a blending of the desired boost at the start of a transition period preceding the gear shift. In either case, the boost blending may be adjusted such that the increased boost is attained before the gear shift is completed.

At 314, the routine may determine turbocharger control and schedule settings for the desired boost and desired boost blending (turbo_desmap_comp). As previously mentioned, the turbocharger settings adjusted may include a desired boosting level, a desired wastegate valve position, a desired vane position, a desired airflow, etc. Additionally, a desired throttle position may be established to attain the desired boost profile. The routine may then proceed to 316 to operate the turbocharger based on the determined settings to provide the desired boost profile. That is, the turbocharger may be operated to enable the transmission to be operated at the second, higher gear with the increased (second) boost. To further clarify the boost adjustments of routine 300, an example boost adjustment in response to a predicted gear upshift is illustrated in FIG. 4.

Now turning to FIG. 4, a timing map 400 is illustrated elaborating the adjustments performed in response to the prediction of a gear upshift, to thereby adjust a boost level during and after completion of the gear shift. Graph 402 represents the change of a transmission gear from a first lower gear 403a to a second higher gear 403b (for example from a transmission first gear to a second gear, or a second gear to a third gear, etc.). The engine controller may predict a transmission upshift based at least on an engine speed and/or vehicle speed profile. For example, the controller may use a shift schedule stored in the controller memory to predict an upcoming gear shift. In the depicted example, in response to a gradual increase in vehicle speed and/or engine load (not shown), the controller may predict a gear upshift 412 at $t_1$. Accordingly, an upshift command 414 may be signaled by the controller at $t_2$. However, before the gear is shifted from the first lower gear 403a to the second higher gear 403b, the engine may first enter a transition period 416 wherein the engine prepares for the upshift. At the end of the transition period, specifically at $t_3$, the upshift completion 418 may be signaled.

As shown by graph 404, it may be desired to increase the driver-demanded torque as engine speed drops during the transition between gears (as shown by graph 406), to provide a smaller drop in engine power output (which is proportional to torque multiplied by speed). In one example, the desired engine torque may increase during the upshift, but not sufficiently to result in constant engine power. In alternate examples, the desired torque before the gear upshift may be the same as or slightly lower than the desired torque during and/or after the gear upshift. As such, based on the desired torque, a wheel torque may vary.

As shown by graph 406, the engine speed ($N_e$) may be steadily rising in the first lower gear 403a before the upshift command 414. Then, following the upshift command 414 at $t_2$, the engine speed may start to reduce. As such, this drop in engine speed may cause a potential fall in output torque. Thus, to enable the driver-demanded torque to be maintained at the desired level, a boost level may be increased to compensate for the torque loss. Following upshift completion 418 at $t_3$, the engine speed may gradually rise (for example, back to the engine speed before the gear upshift).

Graphs 408 and 410 depict an example boost increase that may be scheduled by the controller in response to the upshift prediction 412, to enable an increased aircharge to be provided to the engine. Specifically, the boost is depicted in terms of a pressure upstream of the throttle in graph 408 and a pressure downstream of the throttle (or MAP) in graph 410. In the depicted example, in anticipation of a torque loss during the gear upshift, and further in anticipation of an increased torque demand during the gear upshift, a boost may be prepositioned. That is, in anticipation of the need of a higher MAP following the upshift (that is, after $t_3$), the turbocharger settings may be adjusted to initiate a build-up of pressure upstream of the throttle concurrent with the upshift prediction 412 and before starting the shift. Herein, the boost increase may be initiated before the transition period 416 and may be gradually increased to bring MAP to the desired level over at least some part of the transition period 416, such that the elevated MAP is available at or before the upshift completion 418 (at $t_3$). In this way, the boost may be blended to match the gear shift. It will be appreciated that while the depicted example illustrates initiating boost blending at a time before the transition period 416 and concurrent with the upshift command 414, in alternate examples, based on the engine operating conditions, the boost increase may be initiated at the start of the transition period 416.

As such, the elevated manifold air pressure during the transition period 416 may cause the output torque to increase beyond the driver-demanded torque. Thus, during the increase in boost or pressure upstream of the throttle, over the transition period 416, torque disturbances caused by the increasing boost may be compensated using throttle adjustments.

In the depicted example, as shown by graph 411, the throttle opening may be gradually reduced (or closed) prior to the upshift, as the boost level increases. Then, during the upshift, as the engine speed drops, the throttle opening may be gradually increased. Following the completion of the upshift, that is, at $t_3$, the throttle opening may be maintained in the open state to attain the desired airflow. While the depicted example illustrates an increase in the throttle opening following the upshift, it will be appreciated that in alternate examples, the throttle opening may be decreased, or maintained, based on the airflow desired following the upshift, and/or further based on the turbocharger settings following the upshift. This allows the aircharge to be reduced during the transition without causing a sudden change in engine torque, while allowing the aircharge and boost levels to be immediately raised to the desired level upon gear upshift. In this way, during the increase in boost or pressure upstream of the throttle, torque disturbances caused by the increasing boost may be compensated by decreasing the throttle position to achieve a desired engine airflow during the boost increase.

By predicting an amount of boost increase that may be desired in the new gear following a predicted gear upshift, and further by providing and holding the boost in reserve, it may be possible to enable adjustment of the shift schedule, e.g., enabling an upshift at a lower engine speed, for a given pedal position. As such, the amount of boost increase may be adjusted based on the new gear, and engine operating conditions at the time of, and following, the gear shift. In one example, during cooler ambient conditions, based on the vehicle speed and engine load profile, the controller may predict a gear upshift from a transmission first gear to a transmission second gear at a first lower engine speed. The controller may predict a first increased boost level desired in the new gear to maintain the desired torque following the gear shift. The controller may further determine that the corresponding amount of boost increase may be provided by the turbocharger under the given engine operating conditions without causing degradation, such as engine knock. Thus, the controller may schedule the boost increase at or after the gear upshift prediction, hold the boost in reserve, command an "earlier" (e.g., lower engine speed) gear upshift, and provide the desired boost in the new gear. That is, during the first upshift without knock constraints, the controller may increase boost by a first higher amount before completing the upshift.

In another example, during warmer and drier ambient conditions, based on the same vehicle speed and engine load profile, the controller may predict that a gear upshift from the transmission first gear to the transmission second gear at the lower engine speed will cause knocking after completing the shift, due to the first amount of increased boost. To address the knocking, the controller may then "delay" the gear upshift, and perform the gear shift at a second higher engine speed using a second amount of boost increase, the second amount lower than the first amount noted in the example described above. Thus, the controller may then predict a second boost level desired in the new gear to maintain the desired torque following the gear shift. Herein, given the later gear upshift, the corresponding amount of boost increase required may be lower than the "earlier" upshift. Thus, the controller may schedule the lower amount of boost increase to start at a later time as compared to the above example, hold the boost in reserve, command the later gear upshift, and then provide the lower boost in the new gear. That is, during the second upshift with knock constraints, the controller may increase boost by a second amount before completing the upshift, the second amount lower than the first amount provided in the upshift without knock constraints. In this way, based on engine operating conditions, an amount and timing of pre-boosting may be adjusted such that the desired boost and the desired torque is available as soon as the transmission is in the new gear.

Similarly, the amount of pre-boosting increase may be affected by whether the gear upshift is from a transmission second gear to a third gear, or from a third gear to a fourth gear, the vehicle speed at which the gear change occurs, etc. For example, a higher amount of boost increase may be required when shifting from the second gear to the third gear and a lower amount of boost increase may be required when shifting from the third gear to the fourth gear. In this way, by adjusting a gear shift point and an amount of boost increase responsive to engine operating conditions, potential issues such as knock may be addressed, and the quality of the gear upshift may be improved.

In one example, the boost level may be increased by adjusting the setting of the wastegate valve. For example, the engine controller may be configured to decrease the degree of opening of the wastegate valve, to thereby reduce the amount of exhaust gas that is allowed to bypass the turbocharger turbine. Additionally, or optionally, the engine controller may be configured to decrease the duration of opening of the wastegate valve. In one example, when the wastegate valve is a solenoid valve, the controller may activate or deactivate the solenoid (based on the valve configuration), and/or adjust the duty cycle of the solenoid, to adjust the amount of exhaust gas that bypasses the turbine through the wastegate. In this way, by reducing the amount of exhaust gas that is allowed to bypass the turbocharger turbine, the amount of pressurized aircharge supplied to the intake manifold may be increased, thereby increasing the boost level. In alternate examples, alternate turbocharger settings may be appropriately adjusted to achieve the elevated boost.

While the abovementioned example illustrates boost modulation using wastegate valve adjustments, in alternate examples, boost modulation may be achieved by adjusting the vane position (for example, when the turbocharger is a variable geometry turbocharger), or adjusting the nozzle position (for example, when the turbocharger is a variable nozzle turbocharger).

In this way, by prepositioning a boost, an elevated boost needed at the higher gear following a gear upshift may be attained substantially before the upshift occurs. By holding the boost in reserve before the upshift, the elevated boost may be provided as soon as it is needed. In this way, the sensation of turbo lag may be substantially eliminated because there is always a throttle position that provides the desired airflow and torque. Thus the quality of the shift may be improved. Furthermore, the vehicle performance may be improved via improvements in through-gear acceleration.

Note that the example process flows included herein can be used with various valve system, engine system, and/or vehicle system configurations. These process flows may represent one or more of any number of processing strategies such as event-driven, interrupt-driven, multi-tasking, multi-threading, and the like that may be performed by the control system. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or operations may be repeatedly performed depending on the particular strategy being used. Further, the described acts may graphically represent code to be programmed into a computer readable storage medium of the control system.

It will be appreciated that the configurations and process flows disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a vehicle engine, the engine including a turbocharger and a transmission, comprising,
   operating the transmission at a first lower gear with a first boost level;
   increasing the boost from the first boost level before completing an upshift to a second higher gear; and
   after completing the upshift, operating the transmission at the second higher gear with the increased boost.

2. The method of claim 1, further comprising, predicting the shift from the first lower gear to the second higher gear based at least on a vehicle speed and/or engine load.

3. The method of claim 2, wherein increasing boost includes initiating the boost increase following the gear upshift prediction and before starting the shift.

4. The method of claim 1, wherein increasing the boost includes increasing the boost from the first boost level during a transition period before the gear shift is started, and initiating the boost at the start of the transition period.

5. The method of claim 1, wherein the increase in boost is based on the second gear.

6. The method of claim 1, wherein the increase in boost is based on engine operating conditions in the second gear including at least one of an engine speed and an engine load, torque or manifold pressure in the second gear.

7. The method of claim 1, wherein the turbocharger is a variable geometry turbocharger, and wherein increasing boost includes at least one of decreasing a degree of opening, decreasing a duration of opening of a turbocharger wastegate valve, adjusting a vane position, and adjusting a nozzle position.

8. The method of claim 1, further comprising, during the increase in boost or pressure upstream of the throttle, compensating torque disturbances caused by the increasing boost by decreasing throttle position to achieve desired engine airflow during the boost increase.

9. A method for controlling a vehicle engine, the engine including a turbocharger and a transmission, comprising,
   operating the transmission at a first lower gear with a first boost;
   predicting a gear upshift from the first lower gear to a second higher gear;
   increasing the boost from the first boost to a second boost before completing the gear upshift, said second boost higher than said first boost; and
   after completing the gear upshift, operating the transmission at the second higher gear with the second boost.

10. The method of claim 9, wherein the gear upshift is predicted based on a shift schedule, the shift schedule based a vehicle speed and/or engine load profile.

11. The method of claim 10, wherein the second boost is based on the second gear and/or engine operating conditions in the second gear, the engine operating conditions in the second gear including at least one of an engine speed, an engine load, and a vehicle speed in the second gear.

12. The method of claim 11, wherein increasing the boost includes increasing the boost during a transition period before the gear shift is started, and initiating the boost at the start of the transition period.

13. The method of claim 12, wherein the turbocharger is a variable geometry turbocharger, and wherein increasing boost includes at least one of decreasing a degree of opening, decreasing a duration of opening of a turbocharger wastegate valve, adjusting a vane position, and adjusting a nozzle position.

14. The method of claim 13, further comprising, during the boost increase, compensating torque disturbances caused by the increasing boost using throttle adjustments.

15. A vehicle system, comprising,
   an engine;
   a boosting device coupled to the engine intake manifold and exhaust manifold, the boosting device configured to provide a boosted aircharge to the intake manifold;
   a transmission including a plurality of gears; and
   a control system configured to:
      operate the transmission at a first lower gear with a first boost;
      predict a transmission gear upshift from the first lower gear to a second higher gear;
      increase the boost from the first boost level before completing a shift from the first lower gear to the second higher gear; and
      after completing the gear upshift, operate the transmission at the second higher gear with the increased boost.

16. The system of claim 15, wherein an amount of boost increased and a shift point of the gear upshift is based on the second gear and/or engine operating conditions in the second gear.

17. The system of claim 16, wherein the boost increase is initiated following the gear upshift prediction and before starting the gear upshift.

18. The system of claim 17, wherein the boosting device is a variable geometry turbocharger, and wherein increasing boost includes at least one of decreasing a degree of opening, decreasing a duration of opening of a turbocharger wastegate valve, adjusting a vane position, and adjusting a nozzle position.

19. The system of claim 18, wherein the control system is further configured to, during the boost increase, compensate torque disturbances caused by the increasing boost using throttle adjustments.

20. A method of controlling a vehicle having an automatic transmission and a turbocharged engine, the method comprising:
   during a first upshift without knock constraints, increasing boost by a first amount before completing the upshift; and
   during a second upshift with knock constraints, increasing boost by a second amount before completing the upshift, the second amount lower than the first amount.

* * * * *